US011522776B1

(12) United States Patent
Pai (10) Patent No.: US 11,522,776 B1
(45) Date of Patent: Dec. 6, 2022

(54) SYSTEMS AND METHODS TO COLLECT AND STORE NETWORK TRAFFIC STATITICS OF IP DESITNATIONS IN TIME-SERIES FORMAT

(71) Applicant: CRADLEPOINT, INC., Boise, ID (US)

(72) Inventor: Prashant Pai, Los Gatos, CA (US)

(73) Assignee: CradlePoint, Inc., Boise, ID (US)

(*) Notice: Subject to any disclaimer, the term of this patent is extended or adjusted under 35 U.S.C. 154(b) by 0 days.

(21) Appl. No.: 17/343,915

(22) Filed: Jun. 10, 2021

(51) Int. Cl.
*H04L 43/0811* (2022.01)
*H04L 43/045* (2022.01)
*H04L 43/062* (2022.01)
*H04L 41/22* (2022.01)
*H04L 43/0882* (2022.01)

(52) U.S. Cl.
CPC .......... *H04L 43/045* (2013.01); *H04L 41/22* (2013.01); *H04L 43/062* (2013.01); *H04L 43/0811* (2013.01); *H04L 43/0882* (2013.01)

(58) Field of Classification Search
CPC . H04L 43/045; H04L 43/062; H04L 43/0811; H04L 43/0882
See application file for complete search history.

(56) References Cited

U.S. PATENT DOCUMENTS

| | | | | |
|---|---|---|---|---|
| 6,515,968 B1* | 2/2003 | Combar | ............... | G06F 11/0709 370/252 |
| 7,385,924 B1* | 6/2008 | Riddle | ................ | H04L 41/5022 370/235 |
| 10,652,281 B1* | 5/2020 | Moolenaar | .......... | H04L 63/0428 |
| 2005/0276230 A1* | 12/2005 | Akahane | ................ | H04L 43/00 370/252 |
| 2010/0034109 A1* | 2/2010 | Shomura | ................ | H04L 41/142 370/252 |
| 2011/0305147 A1* | 12/2011 | Xu | ....................... | H04L 47/2433 370/252 |
| 2012/0079101 A1* | 3/2012 | Muppala | .............. | H04L 63/1425 709/224 |
| 2012/0218893 A1* | 8/2012 | Natarajan | ........... | H04L 12/4645 370/235 |
| 2013/0294239 A1* | 11/2013 | Szabo | ..................... | H04L 45/38 370/235 |
| 2016/0359872 A1* | 12/2016 | Yadav | ................. | H04L 63/1425 |
| 2020/0067952 A1* | 2/2020 | Deaguero | ............. | G06F 21/552 |
| 2020/0169509 A1* | 5/2020 | Tigli | ..................... | H04L 41/145 |
| 2021/0051100 A1* | 2/2021 | Chitalia | ............... | H04L 12/4641 |

* cited by examiner

*Primary Examiner* — Philip C Lee
(74) *Attorney, Agent, or Firm* — Parsons Behle & Latimer (57) ABSTRACT

Disclosed embodiments include a system for displaying access market network device network traffic statistics for active Internet Protocol (IP) destinations. The system includes a network device having a connection tracker module that maintains connection-based traffic flows in a packet forwarding path, and a flowstats module that receives data for connection-based traffic flows from the connection tracker module and communicates with an analysis module to generate a table of network traffic statistics for active IP destinations.

13 Claims, 6 Drawing Sheets

| IP destination | # of connections | # Packets In | # Packets Out | Application id | #TCP packets | #UDP packets | #Bytes In | #Bytes Out |
|---|---|---|---|---|---|---|---|---|
| 35.233.104.72 | 3 | 6854 | 12375 | 19 | 19327 | 0 | 357410 | 15096964 |
| 192.55.54.16 | 35 | 7143 | 5083 | 12 | 0 | 12226 | 4673353 | 1305118 |
| 157.112.22.35 | 27 | 364 | 291 | 22 | 0 | 655 | 245883 | 171827 |
| 65.8.12.33 | 4 | 1665 | 1050 | 19 | 2715 | 0 | 6466455 | 96207 |
| 177.88.33.44 | 1 | 16927 | 24065 | 354 | 38120 | 1655 | 8356123 | 5677344 |
| 22.33.54.1 | 45 | 3566 | 7766 | 23 | 0 | 11435 | 2894571 | 967888 |
| 129.34.56.3 | 6 | 2344 | 544 | 32 | 2823 | 125 | 346688 | 73048 |
| 34.88.98.35 | 6 | 7889 | 677 | 0 | 7236 | 1294 | 15637 | 23567 |
| 87.44.90.100 | 2 | 902 | 245 | 34 | 745 | 312 | 23566 | 46788 |
| 33.44.12.90 | 5 | 345 | 67 | 23 | 410 | 23 | 73567 | 1956 |

| IP source – Destination |
| TCP/UDP Port # |
| Bytes |
| Packets |
| ... |
| Others |

| IP destination | # of connections | # Packets In | # Packets Out | Application id | #TCP packets | #UDP packets | #Bytes In | #Bytes Out |
|---|---|---|---|---|---|---|---|---|
| 35.233.104.72 | 3 | 6854 | 12375 | 19 | 19327 | 0 | 357410 | 15096964 |
| 192.55.54.16 | 35 | 7143 | 5083 | 12 | 0 | 12226 | 4673353 | 1305118 |
| 157.112.22.35 | 27 | 364 | 291 | 22 | 0 | 655 | 245883 | 171827 |
| 65.8.12.33 | 4 | 1665 | 1050 | 19 | 2715 | 0 | 6466455 | 96297 |
| 177.88.33.44 | 1 | 16927 | 24065 | 354 | 38120 | 1655 | 8356123 | 5677344 |
| 22.33.54.1 | 45 | 3566 | 7766 | 23 | 0 | 11435 | 2894571 | 967888 |
| 129.34.56.3 | 6 | 2344 | 544 | 32 | 2823 | 125 | 346688 | 73048 |
| 34.88.98.35 | 6 | 7889 | 677 | 0 | 7236 | 1294 | 15637 | 23567 |
| 87.44.90.100 | 2 | 902 | 245 | 34 | 745 | 312 | 23566 | 46788 |
| 33.44.12.90 | 5 | 345 | 67 | 23 | 410 | 23 | 73567 | 1956 |

| Applications | Category | Bytes In | Bytes Out |
|---|---|---|---|
| HTTP Protocol over TLS SSL | Network protocols | 50.1 GB | 78.6 GB |
| Amazon | Web services | 17.4 GB | 291.3 MB |
| iTunes | Media streaming services | 4.6 GB | 63.9 MB |
| Zoom | Business tools | 4.4 GB | 517.1 MB |
| Slack | Instant messengers | 4.3 GB | 103 MB |
| YouTube | Media streaming services | 2.4 GB | 45.4 MB |
| HTTP | Web services | 1.2 GB | 27.2 MB |
| Facebook | Social networks | 50 MB | 30 MB |
| Twitch.tv | Media streaming services | 25 MB | 15 MB |
| Twitter | Social networks | 15 MB | 8 MB |

SYSTEMS AND METHODS TO COLLECT AND STORE NETWORK TRAFFIC STATITICS OF IP DESITNATIONS IN TIME-SERIES FORMAT

FIELD OF THE DISCLOSURE

This disclosure relates generally to collection of network access statistics through a network device. In particular, this disclosure relates to collection and storage of access market network device network traffic statistics to the most active Internet Protocol (IP) destinations in a time-series format.

BACKGROUND

It is often desirable to analyze IP network traffic so that a network administrator or the like can determine things such as the source and destination of the traffic, class of service, causes of network issues, and the like. Existing solutions include Netflow and IPFIX and are features available on many routers today that provide the ability to collect IP network traffic as it enters or exits an interface.

However, existing solutions have drawbacks and other issues. For example, for network devices, such as routers, usually the source IP address is unique or can be determined based on an outbound wide area network (WAN) interface. When the traffic rates are high, checking every packet for Netflow statistics is not efficient. Hence, most high traffic routers use some sort of sampling technique. In some existing solutions, one packet out of every n packets is processed, where n is the sampling rate. Typically, values of n are around 100, which means only 1% traffic is typically sampled. Thus, a majority of the traffic is not accounted for. Other drawbacks and issues also exist.

SUMMARY

Accordingly, disclosed systems and methods address the above and other drawbacks and issues of existing solutions. For example, some of the disclosed systems and methods do not require the storage of information about an entire traffic flow including source and destination address, as for example Netflow does. In addition, some of the disclosed systems and methods collect substantially all the flow traffic data, not just a sample of every n packets.

Disclosed embodiments include a system for displaying access market network device network traffic statistics for active IP destinations, the system including a network device having a connection tracker module that maintains connection-based traffic flows in a packet forwarding path, and a flowstats module that receives data for connection-based traffic flows from the connection tracker module and communicates with an analysis module to generate a table of network traffic statistics for active IP destinations.

Further disclosed embodiments include a management system that communicates with the analysis module and enables a GUI that enables display and manipulation of the table of network traffic statistics for active IP destinations. In still further disclosed embodiments, the display of the table of network traffic statistics for active IP destinations is a ranked, top-ten list of the top IP destinations based on the number of bytes in and/or the number of bytes out. Further disclosed embodiments of the display of the table of network traffic statistics for active IP destinations may further include the number of connections, the number of packets in, the number of packets out, an application ID, the number of TCP packets, the number of UDP packets, and/or a time-based graph of network traffic statistics. Other embodiments, advantages, and features of disclosed embodiments also exist.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

Reference is made in the following detailed description to accompanying drawings, which form a part hereof, wherein like numerals may designate like parts throughout to indicate corresponding and/or analogous components, for example. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or similar references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, and/or characteristic described in connection with a particular implementation and/or embodiment may be included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as packets, bits, data, values, elements, symbols, characters, terms, numbers, numerals and/or the like. It should be understood, however, that all of these and/or similar terms are to be associated with appropriate physical quantities and are intended to merely be convenient labels.

It should be understood that for ease of description a network device (also referred to as a networking device, networked device, and plurals of the same) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof.

In this context, the term network device refers to any device capable of communicating via and/or as part of a network. While network devices may be capable of sending and/or receiving signals (e.g., signal packets), such as via a wired or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of devices, including between wireless devices coupled via a wireless network, for example.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, a network may include sub-networks, such as those that may employ differing architectures, or may be compliant and/or compatible with differing protocols, such as communication protocols (e.g., network communication protocols). In this context, the term sub-network refers to a portion or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link or connection between otherwise separate and/or independent LANs. In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the IP. Here, the term Internet Protocol or IP is intended to refer to any version, now known or later developed. The Internet includes LANs, WANs, wireless networks, and/or long-haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices. As an illustrative example, but without limitation, a node may comprise one or more sites employing a local network address. Likewise, a device, such as a network device and/or a computing device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Typically, a network communications protocol has several layers. These layers may be referred to here as a network communication stack. Various types of network communications may occur across various layers. For example, as one moves higher in a network communication stack, additional operations may be available by transmitting network communications that are compatible and/or compliant with a particular network communications protocol at these higher layers.

A network may be very large, such as comprising thousands of nodes, millions of nodes, billions of nodes, or more, as examples. As the number of network devices communicating via a network grow, signals transmissions via a network, such as in the form of signal packets, for example, may begin to interfere. Thus, it may be desirable to create and/or generate a logical, private network, such as via (e.g., over) the Internet, to potentially limit the number of signal transmissions at least partially without necessarily limiting geographies, for example, by having portions of a logical, connected, secure private network in geographies of potential interest. In addition, it may be possible to purchase available capacity, such as memory and/or processing capacity of a third party, as examples, in separate markets, such as markets where costs may be more appealing, providing another potential benefit, as explained in more detail later. For example, applications, such as software applications, may execute above or on infrastructure, such as networking infrastructure and/or computing infrastructure, in a manner to provide capabilities, such as these as well as others. Thus, for example, one or more software applications may execute on computing and/or memory resources owned by a third party to create and/or generate a logical, private network for an entity other than the third party that owns the computing and/or memory resources, as explained in more detail later. In this context, networking infrastructure refers to conventional hardware and software that is deployed or deployable to provide networking functionality and/or network services without using or including components substantially in accordance with claimed subject. Likewise, in this context, computing infrastructure refers to conventional hardware and software that is deployed or deployable to provide computing functionality and/or services without using or including components substantially in accordance with claimed subject matter.

In this context, the terms cloud, cloud computing, cloud hosting and/or similar terms refers to is the use of network and/or computing resources (e.g., hardware), network and/or computing applications (e.g., software), or any combinations thereof delivered as a service over a network (typically the Internet), meaning here, in essence, the use of hardware and/or software owned by one or more third parties. A benefit of use of the cloud or cloud computing is that it permits someone, such as an entity, (e.g., a network provider, for example) to offer a product and/or service without necessarily owning the hardware and/or software, or at least large portions thereof. Thus, for example, a third-party handles obtaining power, purchasing equipment, renting space, obtaining connectivity, etc. An example, but not the only one, includes Amazon AWS, which, for example, owns and/or provides data centers with equipment, etc., it makes available to others, as described.

A network device comprises a device capable of communicating via a network, as mentioned. A computing device comprises a device capable of executing computations. Thus, for example, network devices may comprise computing devices, non-computing devices, and/or other devices. A network device may comprise, as non-limiting examples, a router, gateway, hub, switch, host, mobile device, server, client, a network address translation (NAT) device, the like, or any combinations thereof. A server, which may comprise a computing device, may also operate as network device, by serving content over a network. For example, a server may provide now known and/or to be later developed, service arrangements, derivatives, and/or improvements, including past, present, and/or future services comprising, but not limited to, web services, third-party services, audio services, video services, email services, instant messaging (IM) services, SMS services, MMS services, voice over IP (VOIP) services, calendaring services, photo services, database services, facsimile services, file services, domain name services, game services, printing services, proxy services, data streaming services, peer-to-peer services, other services, the like or any combinations thereof. Examples of content may include text, images, audio, video, the like, or any combinations thereof, which may be processed in the form of physical signals, such as electrical signals, for example, or may be stored in memory, as physical states, for example.

Likewise, available services via a network device may be determined based at least in part on which ports are open on a network device. Port scanning a network device may determine which ports may be open by transmitting signal packets to request a connection with a network device on a port. A network device may respond, for example, by transmitting signal packets indicating an available connection. See, for example, RFC 793-Transmission Control Protocol, available, for example, from the Internet Engineering Task Force (IETF), at www.ietf.org. Signal packets comprising responses may imply that a port may be available.

Because network port numbers may consistently map to known services, a network device monitoring these responses may at least in part discover which services may be available via other network devices. For example, an open port 20 or 21 may imply that an FTP service may be available. Additionally, SSH may be available via port 22, Telnet may be available via port 23, SMTP may be available via port 25, POP3 may be available via port 110, or HTTPS may be available via port 443, for example. As is known in the art, associations between port numbers and services may be consistent, or may change over time. As associations between port numbers and services evolve, it is intended that claimed subject matter include discovery of available services according to evolving industry standards. As in known in the art, port scanning may be accomplished via TCP scanning, SYN scanning, UDP scanning, ACK scanning, Window scanning, FIN scanning, or other scanning types or methods, as may be known in the art or may later be developed.

A network device may be associated with a node and a controller may be associated with another node. In one example, the network device and the controller may respectively be associated with separate nodes, the nodes being accessible via the Internet Thus, signal packet transmissions may be initiated from a network device to a controller, for example. In this example, a controller may comprise a mechanism for centralized management of a private network. For example, a controller may be implemented on a server. Typically, but not necessarily, a controller may exist virtually, and/or may comprise set instructions being executed via a device, such as a network device and/or computing device. Although a controller may appear to be available, the device may, in an embodiment, comprise a virtual device. For example, a software application may execute instructions such as a virtual device on or above a software stack of a physical device.

A network device, such as described in this example, typically may include a graphical user interface (GUI), so that rendering of the GUI may take place. Of course, any one of a host of mechanisms to accomplish this are possible. For example, a standard web browser may be employed to render a GUI. A GUI, for example, may be rendered on a network device and/or a computing device based at least in part on signal packet transmissions to the device that may be initiated by a controller, for example. Thus, a client-server model in which, for example, a controller serves content to a client may be employed to render a GUI on a network device via a conventional browser without a plug-in, for example. Alternately, a plug-in may be employed to facilitate rendering of a GUI. In still another possible embodiment, a device, such as a network device and/or computing device, may include native software to render a GUI. These, of course, are merely illustrative examples and claimed subject matter is not restricted in scope to these or any other particular approaches, now known or later developed, that may be employed to render a GUI on a device having a display, such as on a network device, for example. Although in this example, the Internet was discussed, in an alternative embodiment, of course, the network may comprise any network, such as a stand-alone private network, an intranet, a LAN, a WAN, etc. Thus, as alluded to previously, a device, such as a network device and/or a computing device, to manage a private network may be included within the private network but is not necessarily so.

Likewise, in addition to management of a private network, as described in more detail and illustrated, for example, a GUI may be employed in connection with virtual deployment of network services, resources and/or applications. For example, a GUI may be rendered giving a user of a private network an ability to request provisioning and/or removal of services, resources and/or applications, such as, for example, the previously described non-limiting set of examples. Likewise, although navigating a GUI by a user involves human activity to make a selection, after a user request is provided, such as via a GUI, provisioning and/or removal of requested services, resources and/or applications may take place without further human intervention.

In connection with monitoring network traffic various parameters may be measured. As a non-limited list of examples, average throughput in a particular unit of time, real-time through put, average utilization in a particular unit of time, real-time utilization, average latency in a particular unit of time and/or real-time latency of network communication packets may be monitored and/or measured. In addition, measurements may be taken over different routes, over a complete loop, over the entire private network, over sub-networks, over a logical broadcast domain, between any two or more nodes, etc. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof.

Figure 1:
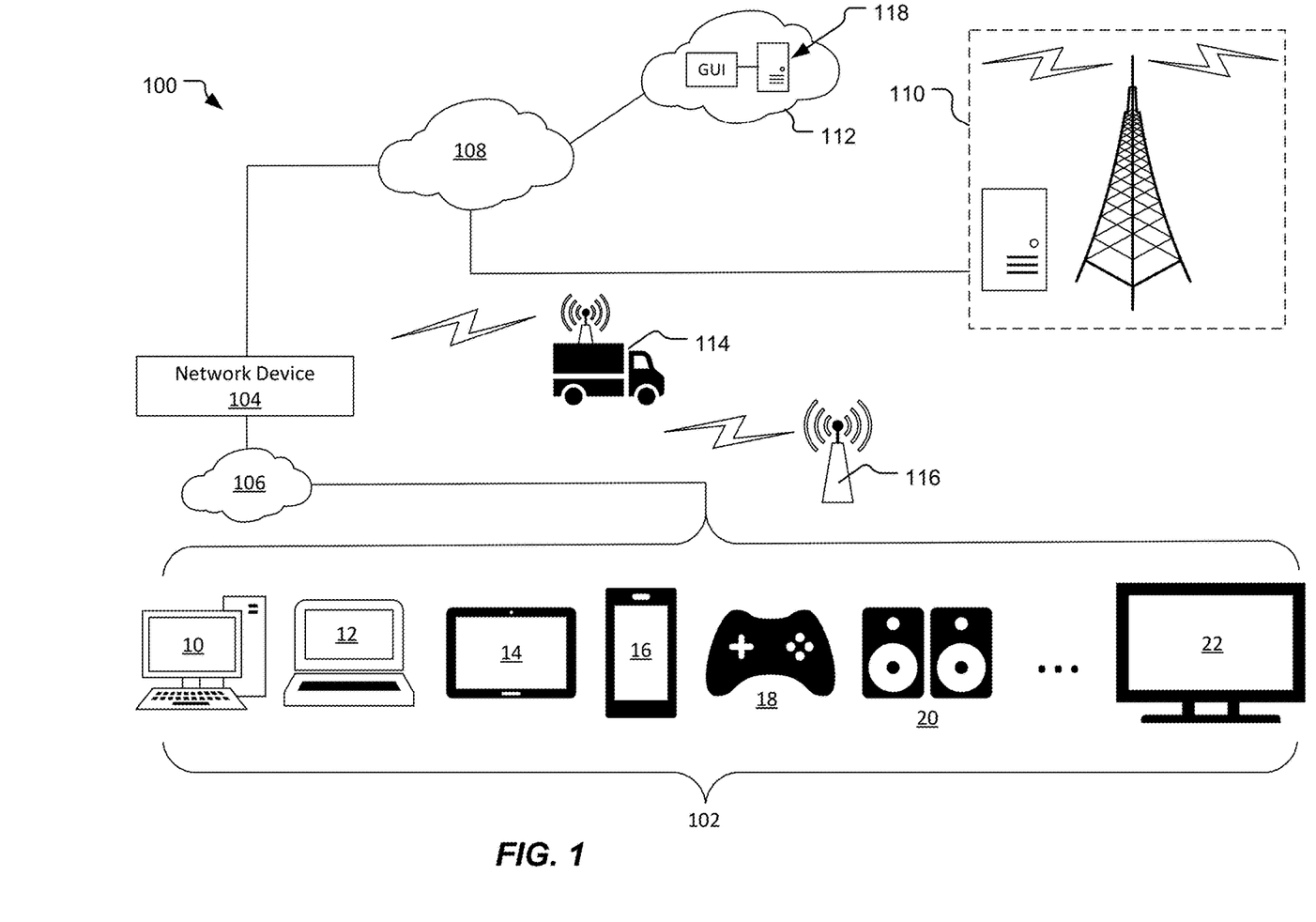
FIG. 1 is a schematic diagram of an exemplary environment in which disclosed embodiments may be implemented.

FIG. 1 is a schematic diagram of an exemplary environment 100 in which disclosed embodiments may be implemented. As illustrated, a number of computing devices 102 may communicate with a network device 104, such as a remote access router, or the like. By way of non-limiting example, computing devices 102 may include personal computers (PC) 10, laptop computers 12, tablet devices 14, smartphones 16, gaming systems 18, voice-activated speaker systems 20, smart televisions 22, mobile routers 114, telemetric devices 116, other devices capable of communicating with network device 104, and the like.

As illustrated, computing devices 102 communicate with network device 104 over a local link 106 which may generally be a cable, wireless, or remote link via a telecommunication link, an infrared link, a radio frequency link, or any other connector or system that provides electronic communication between computing devices 102 and network device 104. The path followed by local link 106 between computing device 102 and network device 104 in the schematic view of FIG. 1 represents the logical communication path between these devices, not necessarily the physical path between the devices. Computing devices 102 and network device 104 can be connected at any point and the appropriate communication path established logically between the devices.

As illustrated, network device 104 communicates with a WAN, such as the Internet 108, or the like. One or more service providers 110 that represent, generally, infrastructure configured to provide Internet-related data services to users. For example, a service provider 110 may be a cellular telephone service provider capable of providing voice and data services to users allowing access to Internet 108, or a service provider 110 may include traditional Internet service providers (ISP) providing wired (e.g., DSL, cable, fiber-optic, or the like) or satellite data access to internet 110.

As illustrated, system 100 may also include an Internet-based, cloud management system 112, such as NetCloud™ Manager provided by Cradlepoint, Inc., of Boise, Id., and that comprises a cloud-based, software-as-a-service (SaaS) platform to enable a user to access a management system 118 and use a GUI or the like to manage network device 104 over the Internet 108. In some embodiments, the management system 118 and GUI, or the like, to manage network device 104 may be displayed on a local computing device 102 in communication with network device 104.

As will be understood by those of ordinary skill in the art having the benefit of this disclosure, any of the schematic links between elements in environment 100 represents generally any combination of a cable, wireless, or remote connection via a telecommunication link, an infrared link, a radio frequency link, or any other connectors or systems that provides electronic communication between computing devices 102, network device 104, service providers 110, and cloud management system 112.

Figure 2:
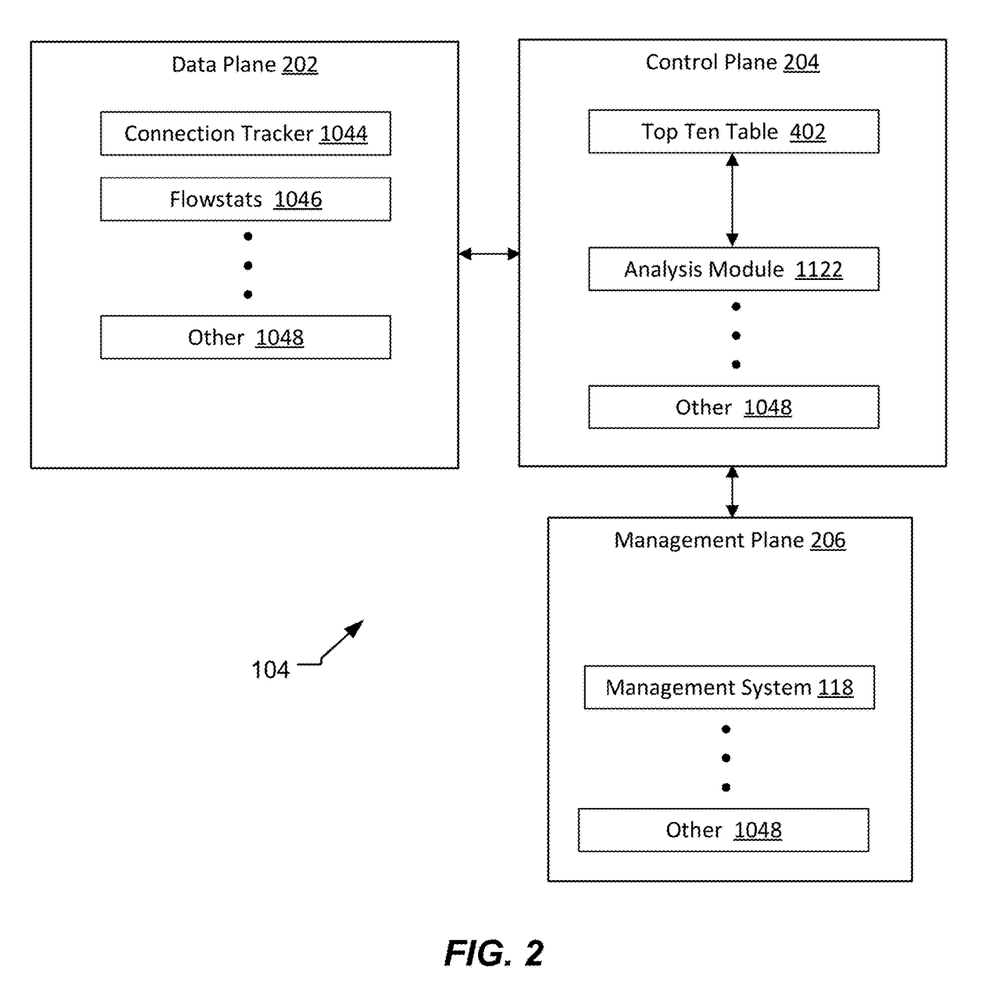
FIG. 2 is a schematic illustration of embodiments of software modules in accordance with disclosed embodiments.
Figure 3A:
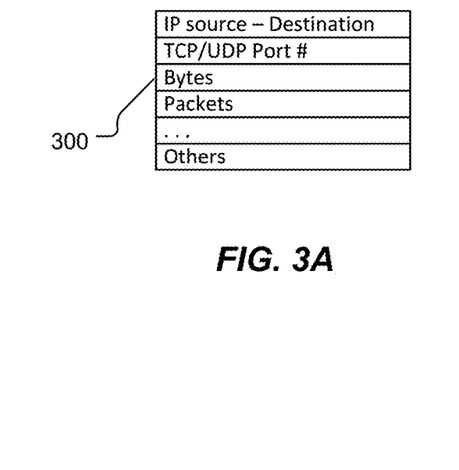
FIG. 3A is a schematic illustration of a data structure in accordance with disclosed embodiments.

FIG. 2 is a schematic illustration of embodiments of software modules in accordance with disclosed embodiments. As indicated, network device 104 may include firmware and/or software instructions to carry out various functions and operations of the network device 104 on the data plane 202, the control plane 204, and the management plane 206. For example, embodiments may include a connection tracker 1044, such as Conntrack in Linux based systems, that maintains connection-based traffic flows in the packet forwarding path. Embodiments of connection tracker 1042 maintain flow data structures based on IP source-destination and TCP/UDP ports numbers (also called a flow tuple). As shown schematically in FIG. 3A, these data structures 300 store statistics data such as number of bytes and packets sent and received on that flow, among other things. A flow data structure 300 instance may be created when a new flow tuple is observed and is deleted after a predetermined timeout (e.g., five minutes) or in some cases with an explicit termination notification. When a flow is terminated, either explicitly or after a timeout, a function is invoked to call flowstats module 1046, which, as indicated schematically in FIG. 2, may pass the flow related parameters to an analysis module 1122 that maintains a top-ten table 402 as disclosed herein. As also indicated schematically, local or cloud management system 118 communicates with analysis module 1122 as disclosed herein. Embodiments of the system may also include other modules 1048 as would be apparent to those of ordinary skill in the art having the benefit of this disclosures.

Figure 3B:
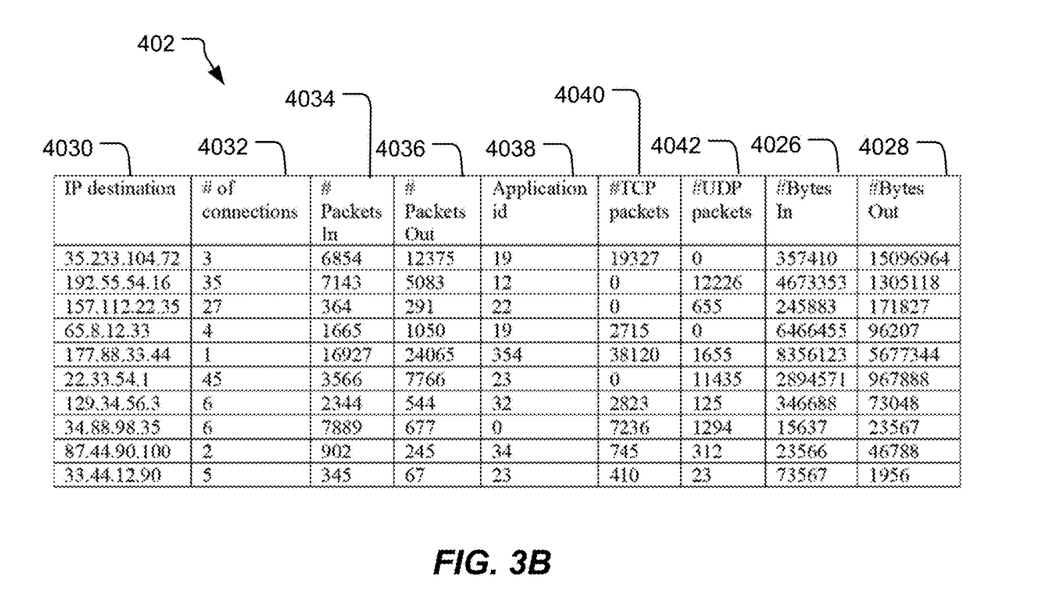
FIG. 3B is a schematic illustration of a top ten table in accordance with disclosed embodiments.

As shown schematically in FIG. 3B, embodiments of flowstats module 1046 maintain a top ten table 402 of all the destinations (in the form of the IP addresses 4030) visited on the WAN side (e.g., Internet 108) of the network device 104. The top ten table 402 stores related traffic data, such as number of connections 4032, number of packets in 4034, number of packets out 4036, the application ID 4038, the number of TCP packets 4040, the number of UDP packets 4042, the number of bytes in 4026, the number of bytes out 4028, and the like. Embodiments of the table also maintain a sorted list 402 of top ten IP destinations 4030. The table 402 may be sorted based any number of the parameters (e.g., 4026, 4028, 4030, 4032, 4034, 4036, 4038, 4040, 4042, or others) to form a ranked or "top-ten list." In some embodiments, when a flow is terminated, the table 402 is updated with information from the new flow and the top-ten list display is updated as well.

In some embodiments, the entire table 402 and top ten list is cleared after a predetermined timeout in order to present a more accurate real time assessment of current flows and not have the list skewed by a legacy high volume flow, or the like. Embodiments of the table 402 also do not require that the entire IP destination 4030 remain sorted all the time as the GUI 400 (see FIG. 4) may maintain only top ten destinations. If a flow is updated that was not initially in the top ten table 402, gains enough additional packets, it will be added to the list and the last entry from the top table 402 will be removed.

Figure 4:
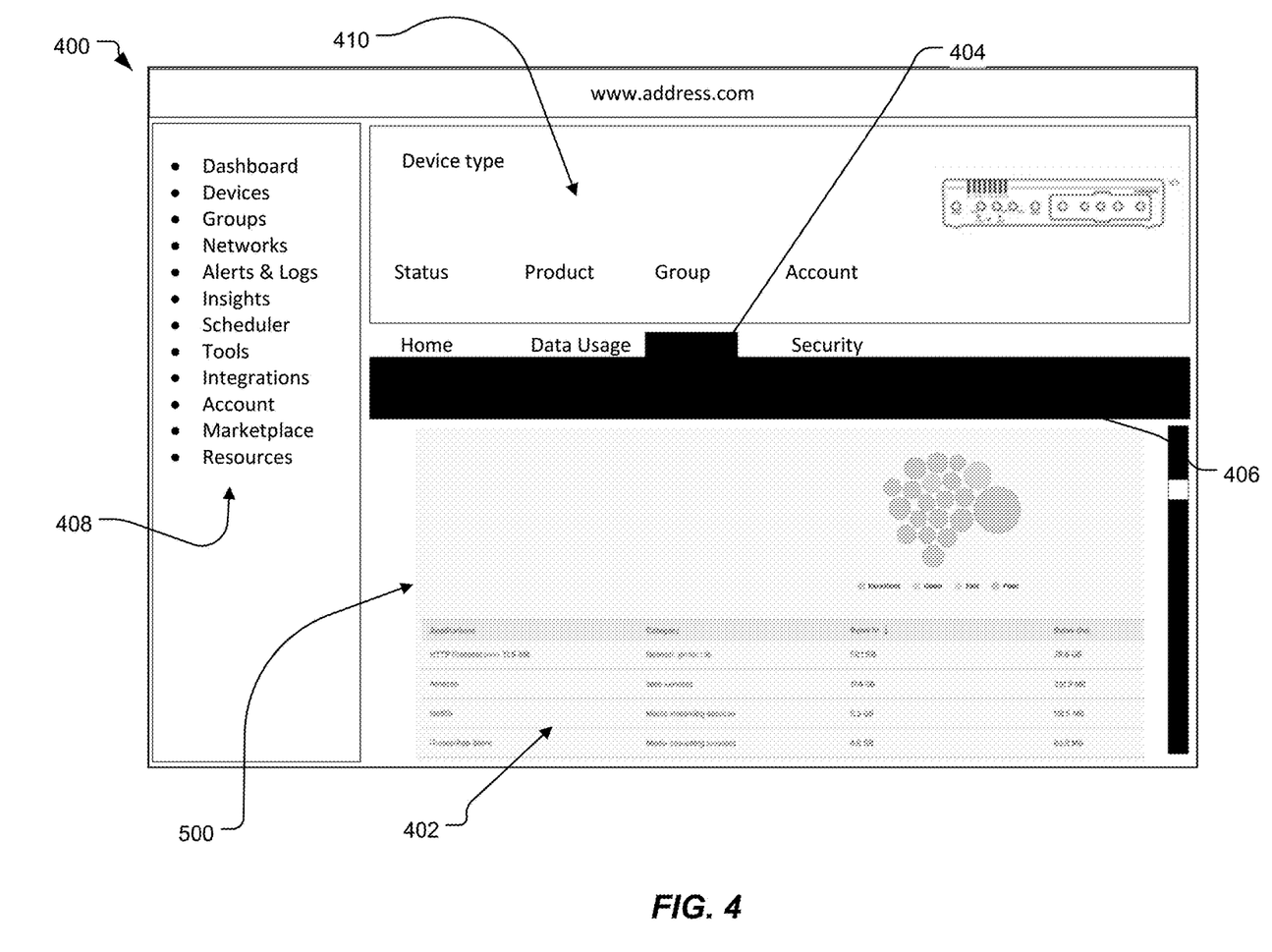
FIG. 4 is a schematic illustration of a GUI that may be displayed on a user's computing device in accordance with disclosed embodiments.

FIG. 4 is a schematic illustration of an example GUI 400 that may be displayed on a user's computing device 102 in accordance with disclosed embodiments. As disclosed herein, GUI 400 may be accessed through a cloud management system 112, on a stand-alone computing device 102, or the like. Among other things, GUI 400 enables users to interact with servers comprising part of the cloud management system 112 to configure, control, diagnose, and otherwise operate network device 104. As discussed above, embodiments of GUI 400 include a display 500 of the top ten table 402. While top ten table 402 is shown in FIG. 4 as appearing in a Health tab 404 and a Quality of Experience (QoE) menu 406, other locations are also possible. As also indicated in FIG. 4, other menus 408 and informative displays 410 are also possible for GUI 400.

In the example GUI 400 shown in FIG. 4, the IP destinations 4030 are mapped to "Application types," such as HTTP web, Netflix, Facebook, YouTube, and the like, in order to be more easily intelligible to ordinary users. For example, the IP destination data 4030 in a table 402 entry may be used to identify the application that the flow is associated with using available software tools, or the like. The IP destination 4030 address may as such be mapped to a specific application, such as Video streaming, Facebook, Web traffic, VPN, or the like. The samples collected may then be displayed on display 500 based on the application type along with the traffic data associated with it such as bytes and packets exchanged. Other configurations are also possible.

Figure 5:
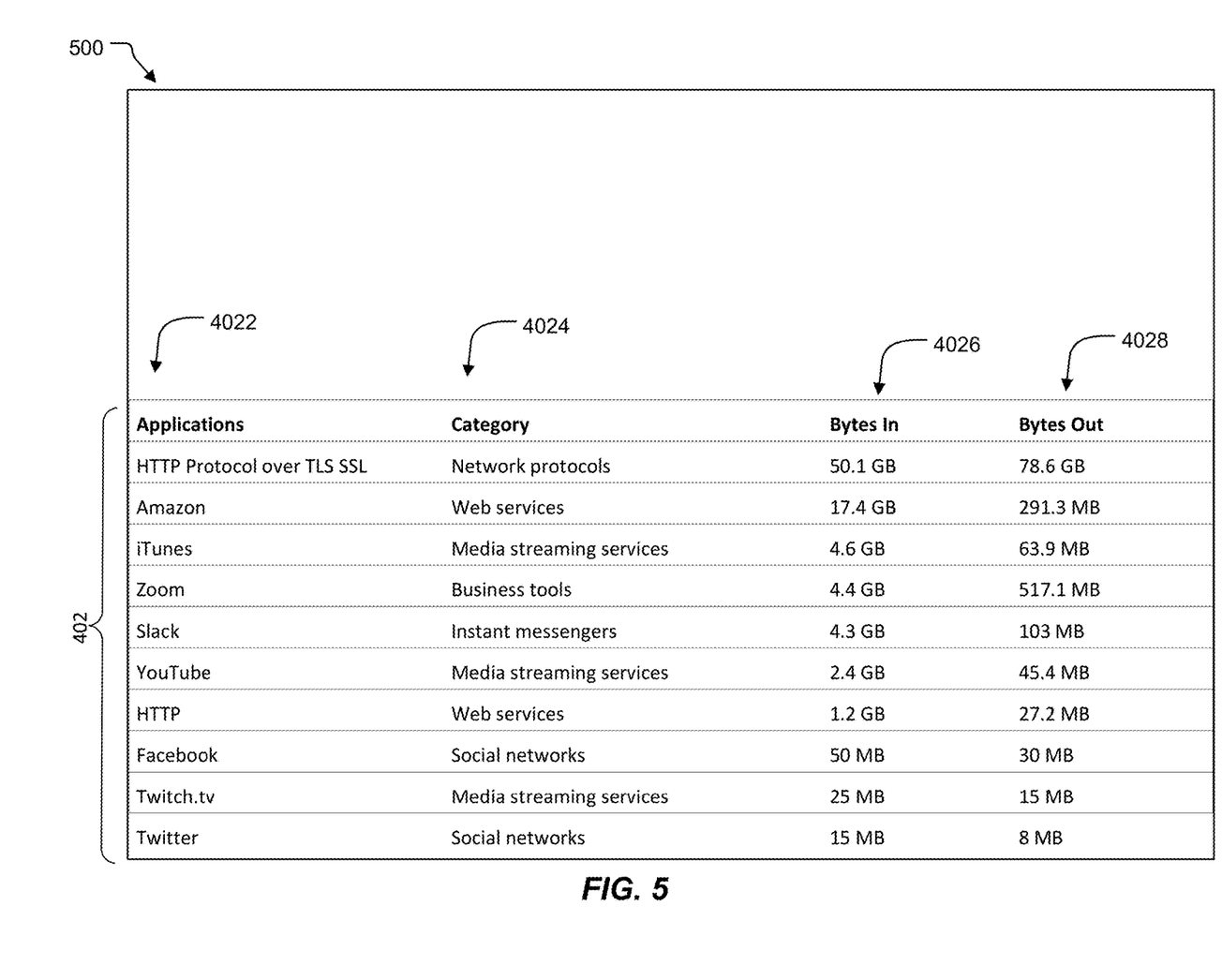
FIG. 5 is a schematic illustration of a top ten list display in accordance with disclosed embodiments.

FIG. 5 is a schematic illustration of a top ten list display 500 in accordance with disclosed embodiments. As illustrated, a listing of the top ten destinations acquired from the flowstats module 1046 may be displayed as a ranked list from table 402 data of the particular applications 4022, the category of application 4024, the number of bytes in 4026, bytes out 4028, and other parameters as desired. As persons of ordinary skill in the art having the benefit of this disclosure would understand, the table 402 may be sorted by other criteria (e.g., alphabetically by application, by category, or the like).

Figure 6:
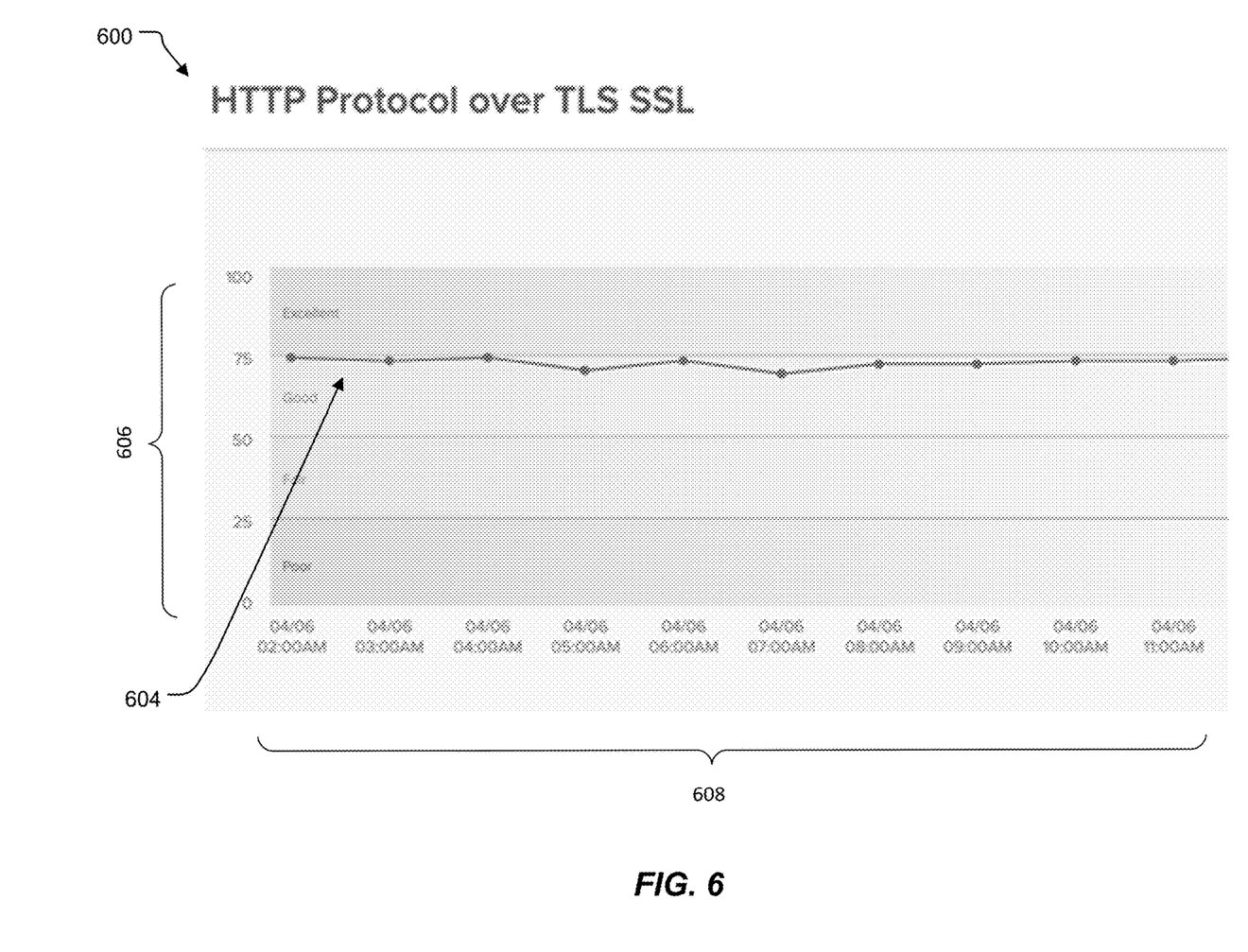
FIG. 6 is a schematic illustration of a drill-down display in accordance with disclosed embodiments.

FIG. 6 is a schematic illustration of a drill-down display 600 in accordance with disclosed embodiments. As persons of ordinary skill in the art having the benefit of this disclosure would understand, clicking on, or otherwise selecting, a particular application 4022 may generate a drill-down display 600 for that application 4022. Embodiments of drill-down display may have a menu-selectable time period that changes the time axis 608 for the graph 604 of the application bytes in 4026 (or other quantity) which is displayed on the vertical axis 606. As also indicated the vertical axis 606 may be shaded, patterned, or otherwise indicative of the subjective quality of experience for that application 4022. Other configurations are also possible.

In some disclosed embodiments, the following data is maintained per IP destination: Destination Address, Number of input packets, Number of output packets, Number of input bytes, Number of output bytes, Number of TCP packets, Number of UDP packets, Average TCP round-trip latency, Number of flows, Outbound interface name, Application type and name for this destination (if available, e.g., video stream/Netflix).

As disclosed herein, a periodic background task running (e.g., every five minutes, or some other period), takes a snapshot of the top-ten IP destinations 4030 along with the traffic data, and clears the table 402. The data from this snapshot is exported to a management system 118, such as a remote server that is part of cloud management system 112 for further analysis, or to a stand-alone management system. Clearing the table 402 results in capturing fresh flow-samples every five minutes (or similar desired duration). The remote server, or other management system 118, eventually gets a series of samples with top ten IP addresses during that sample interval; along with traffic statistics for those destinations. This time-series data can be stored and further analyzed. Each sample reflects the active traffic pattern during the sample duration.

As persons of ordinary skill in the art having the benefit of this disclosure would understand, the time series data for top-ten destinations can be processed and analyzed in many ways. Some useful applications include understanding traffic trends and traffic peaks at specific destination at certain time of the day or week. Other applications include traffic planning and policy based routing for certain high traffic destinations, anomaly detection, for example, by identifying baseline numbers at a specific time and noticing drastic changes in the pattern, evaluating WAN QoE by observing changes in round-trip latency would indicate relative user QoE. Other applications are also possible.

Although various embodiments have been shown and described, the present disclosure is not so limited and will be understood to include all such modifications and variations would be apparent to one skilled in the art.

What is claimed is:

1. A system for displaying access market network device network traffic statistics for active Internet Protocol (IP) destinations, the system comprising:
    a network device comprising:
        a connection-based module that maintains connection-based traffic flows in a packet forwarding path;
        a flowstats module that receives data for the connection-based traffic flows from the connection-based module and communicates with an analysis module to consolidate the data for the connection-based traffic flows based on destination IP address of the connection-based traffic flow, and generate a ranked table of network traffic statistics ordered based on the total packets received and sent across all flows for each ranked destination IP address; and
    a management system that communicates with the analysis module at a periodic rate and receives a predetermined number of entries from the ranked table of network traffic statistics to store as a time series and enables the time series to be displayed in a graphical user interface (GUI) format.

2. The system of claim 1 wherein the ranked table of network traffic statistics further comprises the number of bytes in.

3. The system of claim 1 wherein the ranked table of network traffic statistics further comprises the number of bytes out.

4. The system of claim 1 wherein the ranked table network traffic statistics further comprises the number of connections.

5. The system of claim 1 wherein the ranked table of network traffic statistics further comprises the number of packets in.

6. The system of claim 1 wherein the ranked table of network traffic statistics further comprises the number of packets out.

7. The system of claim 1 wherein the ranked table of network traffic statistics further comprises an application ID.

8. The system of claim 1 wherein the ranked table of network traffic statistics further comprises the number of TCP packets.

9. The system of claim 1 wherein the ranked table of network traffic statistics further comprises the number of UDP packets.

10. The system of claim 1 wherein the ranked table of network traffic statistics further comprises a time-based graph of network traffic statistics.

11. The system of claim 1 wherein the ranked table of network traffic statistics is periodically cleared after a predetermined timeout.

12. The system of claim 1 wherein the ranked table of network traffic statistics further comprises average TCP round-trip latency.

13. The system of claim 1 wherein the predetermined number of entries from the ranked table of network traffic statistics is the top ten active IP destinations.

* * * * *